United States Patent [19]
Kosik, Jr. et al.

[11] 3,901,533
[45] Aug. 26, 1975

[54] SPLASH GUARD

[76] Inventors: Samuel J. Kosik, Jr., Box 231, Botkins Angle Rd., New Knoxville, Ohio 45871; Frank B. Robb, 722 Chestnut Rd., Willoughby, Ohio 44094

[22] Filed: Sept. 7, 1973

[21] Appl. No.: 395,358

[52] U.S. Cl.......................................... 280/154.5 R
[51] Int. Cl............................................ B62d 25/16
[58] Field of Search..... 280/154.5 R, 152 R, 106 R, 280/18; 298/1 SG

[56] References Cited
UNITED STATES PATENTS

| | | | |
|---|---|---|---|
| 1,914,977 | 6/1933 | Persons et al. | 280/154.5 R |
| 2,619,363 | 11/1952 | Wenham et al. | 280/154.5 R |
| 2,758,401 | 8/1956 | Wilson | 280/154.5 R X |
| 3,057,643 | 10/1962 | Eberwine | 280/154.5 R |
| 3,738,678 | 6/1973 | King et al. | 280/106 R |

FOREIGN PATENTS OR APPLICATIONS 837,333  2/1939  France..................... 280/154.5 A

*Primary Examiner*—David Schonberg
*Assistant Examiner*—Michael J. Forman

[57] ABSTRACT

Splash guard construction is disclosed, which comprises a rectilinear body at the opposite edges of which are interlocking parts or formations formed to engage with interlocking elements in the body when the side sections, including the edges, are rolled so as to form cylindrical or tubular sections, which thereby extend along opposite sides and provide a stiffening force whereby the body will be resistant to bending by the wind when mounted in rear of the wheel or wheels of a truck or the like; such tubular sections likewise providing for the insertion of stiffening members where added rigidity is desired, these in turn being usable for mounting purposes.

4 Claims, 8 Drawing Figures

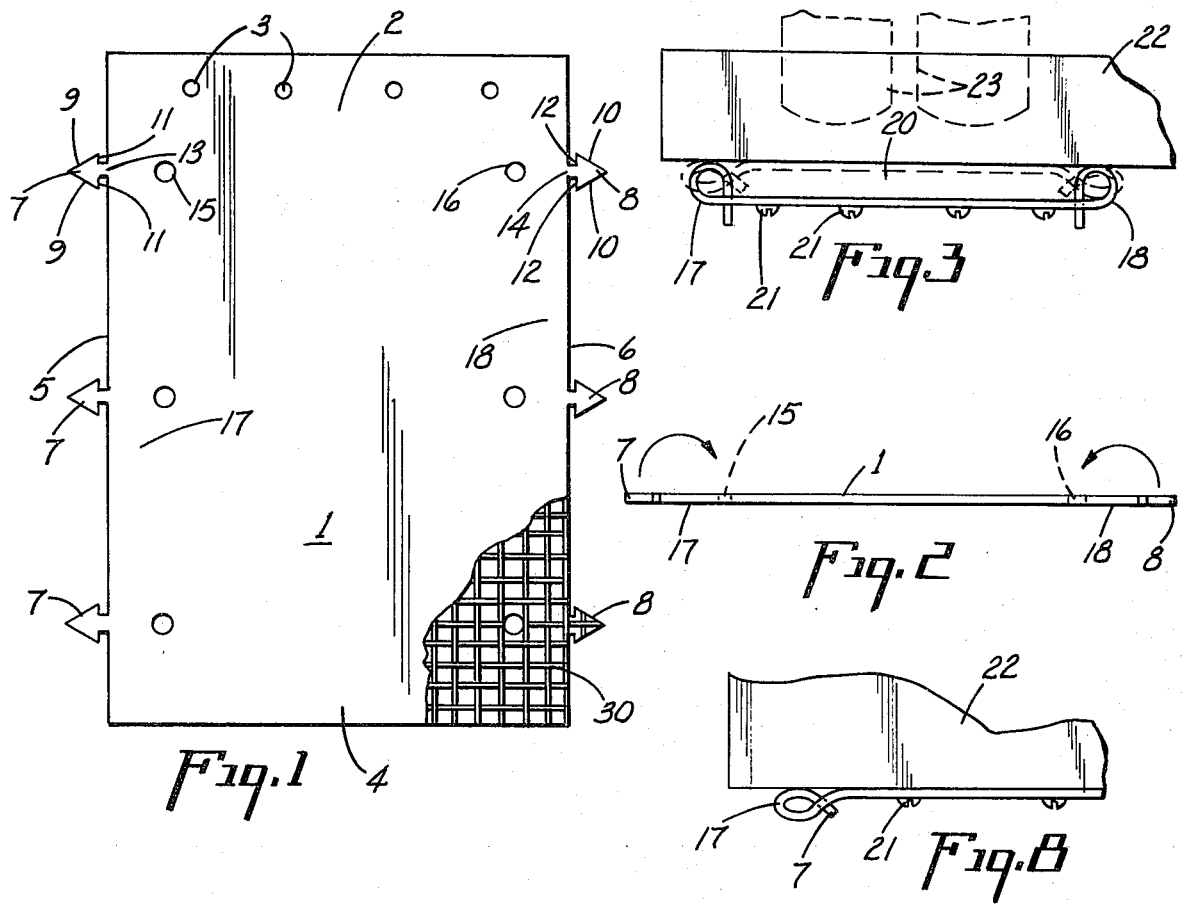
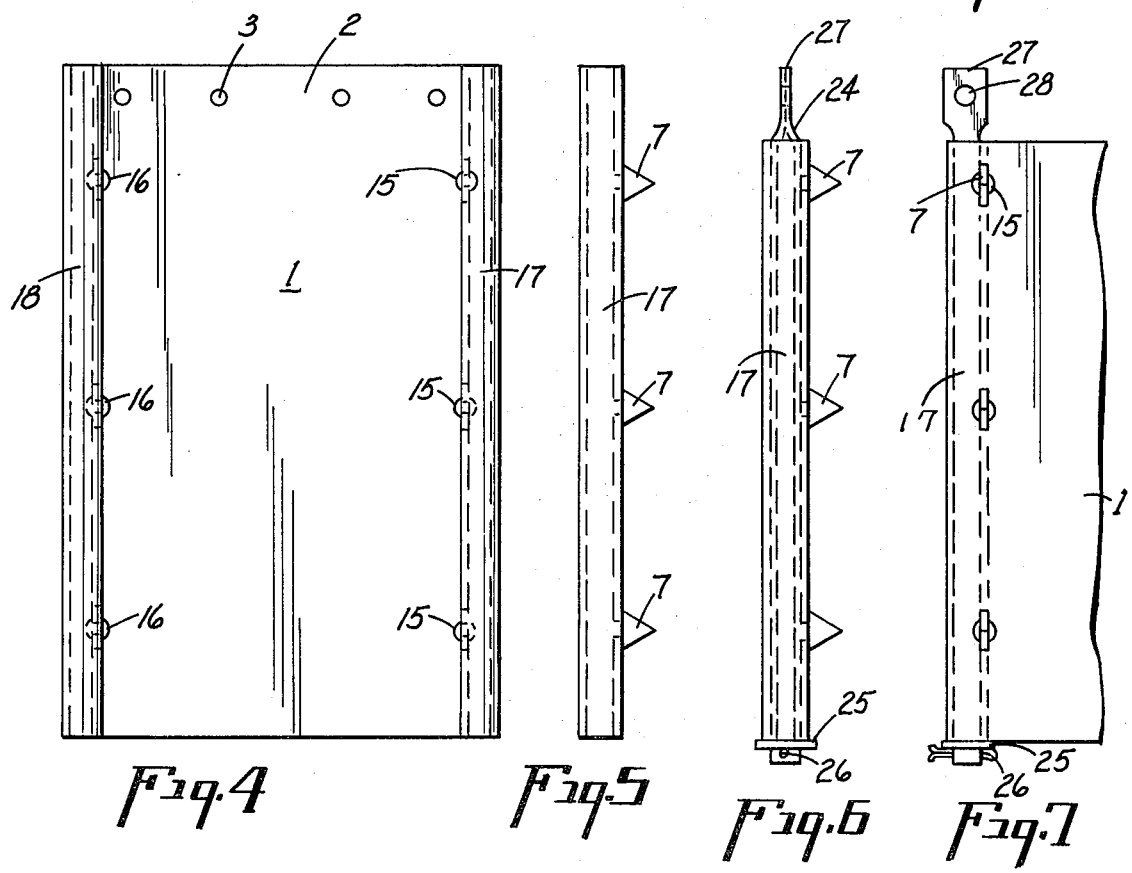

SPLASH GUARD

OBJECTS OF THE INVENTION

It is a particular object of this invention to provide in splash guard construction which is intended for use to prevent wheel splash behind the wheels of trucks or the like, for rigidity of said guards provided by manipulating the body of the guard so as to include thereafter certain rigidifying or stiffening elements in the form of side sections which are tubular, and thus inherently stronger than the flat material from which the splash guard is basically formed.

It is a further object of the invention to provide a splash guard formed of relatively thin material which in the sheet-like form ordinarily availed of is substantially non-rigid, and by forming the side sections so as to comprise in essence cylindrical or tubular sections, to impart to the splash guard more rigid or semi-rigid characteristics.

Another object of the invention is to provide a splash guard formed of flexible, usually rubber-like material in rectilinear shape, having the ordinary provisions for mounting the same at one end in the form of holes, with the side sections at their edges being formed with interlocking parts adapted to engage with interlocking elements in the body itself, and be retained in interlocked condition so that the same present a tubular or cylindrical aspect as the case may be, and by reason of this inherent characteristic of tubular members to resist bending, impart stiffening to the body of the splash guard and thus assist the same in being maintained in a vertical position to reduce rear splash when in use.

A further object of the invention is to provide a splash guard of the form hereinbefore described, wherein by mounting of the splash guard with the tubular sections arranged so as to face forwardly so to speak, the same will tend to reduce side splash as well as effect the rigidifying action for the entire splash guard in its normal use when depending from the rear of a truck or the like behind the wheels thereof.

A further object of the invention is to provide a splash guard wherein the tubular sections provided and heretofore suggested may likewise be equipped with certain stiffening members which, under preferred conditions, may be in turn arranged to support the splash guard in its functional position for the purposes hereinbefore suggested.

Other and further objects of the invention will be understood from a consideration of the specification appended hereto, and disclosed in the drawing, wherein:

FIG. 1 is a plan view of a splash guard as constructed herein, indicating the interlocking parts and the interlocking elements in their respective relationships prior to manipulation for connecting of the same together.

FIG. 2 is an end view of the splash guard, suggesting the manner in which the side sections are to be rolled to bring the interlocking parts and elements into connected position.

FIG. 3 shows the splash guard as viewed from the top in mounted position at the rear of a truck, the truck being shown fragmentarily as to the mounting section thereof, suggesting the tubular nature of the side sections.

FIG. 4 is a front view of the splash guard as the same would be supported on or in the rear of a truck wheel, to illustrate the nature of the tubular side sections.

FIG. 5 is a side view, showing further the interconnected relationship of the interlocking parts and elements providing the tubular side sections.

FIG. 6 is a modified form of the device, showing a separate stiffening member in place, and providing for mounting thereby.

FIG. 7 is a view of the modified form of FIG. 6 in rear elevation, showing the mounting member providing for stiffening when positioned in the side section of tubular form.

FIG. 8 is a fragmentary top edge view of the splash guard mounting without a spacer.

DESCRIPTION OF THE INVENTION

Referring now to FIG. 1, the body of the splash guard is shown as being a generally rectangular member in plan and denoted 1, having at one end 2 the usual mounting holes 3, formed therein at this end 2, the same being the upper end and providing for supporting the splash guard in rear of truck wheels or the like.

The lower end 4 is usually straight, and the body 1 is of such a length as to extend over a substantial area of the space between the bottom edge of the truck body and the ground.

The edges 5 and 6 of the body 1, are straight and provided at intervals with interlocking parts or formations 7 and 8 respectively, which are in this instance in the form of arrowheads for example, with the sloping surfaces 9 and 10 for the respective parts terminating at shoulders 11 and 12 respectively, being spaced shoulders at opposite sides of a connecting portion 13 and 14 in each instance.

The connecting portions 13 and 14 are intended to be about the same or slightly narrower width as the diameter of the interlocking elements denoted 15 and 16, there being as disclosed here, three of these elements in the form of circular openings through the body of the splash guard, these being arranged in side sections 17 and 18 respectively of the splash guard as disclosed herein.

As suggested by FIG. 2, looking at the splash guard in top end elevation so to speak, the side sections 17 and 18 are intended to be rolled up so that the respective interlocking parts 9 and 10 may be inserted in their respective interlocking elements 15 and 16 so that the splash guard now assumes the condition shown in FIG. 3, with the side sections now being tubular or cylindrical.

By this construction and the fact that the space from the edge of the splash guard to the shoulder is about the thickness of the splash guard, which for usual purposes will be resilient rubber-like material of relatively thin dimension in order to conserve as to cost, the rigidifying or stiffening effect provided by the side sections as shown in FIG. 3, will impart sufficient rigidity to prevent sailing as the term is used when splash guards are mounted on trucks.

As suggested in FIG. 3, the splash guard 1 with the rolled side sections is mounted in this instance with the said sections facing forwardly and thereby requiring a spacer such as 20 to be provided, being a suitable member of sufficient thickness to space the upper ends of the tubular side sections, the entire splash guard being supported by suitable bolts such as 21 passing through the openings 3 in the splash guard at the upper end 2 thereof, and to the spacer 20 into the portion of the frame of the truck denoted 22, above and behind the wheels suggested at 23 in dotted lines.

It will be understood that the construction of the interlocking parts is such as to make their insertion in the interlocking elements 15 relatively easy and permit the shoulders 11 and 12 thereof to thereafter assume a condition close to the face of the splash guard 1 as suggested in FIG. 3, and likewise in FIG. 5. This part, extending as it does from the body of the splash guard, will be relatively unobtrusive in any event, and certainly will not be objectionable, the rolled side sections 17 and 18 since they face forwardly, reducing the usual side splash considerably and causing the same to drop downwardly on the pavement over which the truck is moving.

While one of the primary purposes of the construction hereinbefore described is to reduce the costs of such splash guards, at the same time if additional stiffness is desired, the modification shown in FIGS. 6 and 7 may be resorted to, including the insertion in the tubular sections 17 and 18 of stiffening members such as 24 which in this instance are shown as being tubular, extending downwardly through the cylindrical section 17 for example, provided with a washer 25 and a cotter pin 26 to maintain the splash guard in position on the tubular part 24, with the upper end flattened as suggested at 27 and having an opening 28 therein by which the splash guard may now be mounted on the rear portion of the truck frame.

It will be understood of course that the opposite side section of the splash guard will be similarly equipped and by means of the two stiffening members 24, the splash guard may be mounted in any preferred position.

The arrangement hereinbefore described is such as to permit the splash guard to be made of relatively thin, flexible material whether the same be rubber-like or of similar nature, which would normally flex considerably under wind action when in rear of the wheels of a truck, but by reason of the tubular side sections now provided, be substantially stiffer and yet be flexible when obstructions are encountered.

Further, the desirability of rolling the side sections 17 and 18 as suggested, enables the splash guard to be shipped in flat condition obviating the necessity to provide for special packaging, and thus further effecting economy in cost of the article.

The arrangement likewise facilitates the molding of the splash guard 1, so that the body is in flat condition, and any insignia or indicia may be placed thereon whether painted or otherwise molded thereinto with suitable ease of manufacture being of paramount importance.

In lieu of the spacer block 20, the splash guard may be supported so that the tubular side sections 17 and 18 are somewhat distorted when the end 2 of the splash guard is mounted so as to draw the same directly against the frame part, such as 22, this being suggested in the dotted lines in FIG. 3 and fragmentary view, FIG. 8, with the stiffening effect of the tubular sections 17 and 18 being retained.

It may be desirable under some circumstances to provide reinforcing means for the interlocking parts 7 and 8, and the area around the interlocking elements 15 and 16, this being accomplished, as indicated in FIG. 1 at one corner, where a layer of material is shown as being removed, by molding in the body 1, along the side sections 17 and 18, wire or similar mesh such as 30 for example, when the splash guard body is manufactured. Such mesh 30 may be hardware cloth or similar metal or other material which will prevent tearing or damaging the body by localized forces.

In addition to the foregoing, the use of such reinforcing will add substantial rigidity to the side sections when they have been rolled into tubular or cylindrical form.

We claim:

1. In splash guard construction, in combination, a generally rectilinear body including means to mount the same adjacent a wheel for splash control, said body being initially formed in flat condition with interlocking formations integrally formed at one side section of the body for one edge at least and extending outwardly from said edge, said side section being flexible whereby the same may be rolled, and interlocking elements in said body corresponding to and adjacent the same edge as the interlocking formations, said side section being rolled thereafter and said formations being brought into interlocking engagement with the elements, said section thereby forming a tubular section extending longitudinally of the body whereby to provide stiffness to said body.

2. The combination as claimed in claim 1, wherein the body is comprised of relatively thin, flexible material.

3. The combination as claimed in claim 1, wherein parallel sides include said sections.

4. The combination as claimed in claim 3, wherein the side sections are tubular when in the position stated, and stiffening members are mounted in said sections.

* * * * *